United States Patent
Kirshenboim et al.

(10) Patent No.: US 9,383,734 B2
(45) Date of Patent: Jul. 5, 2016

(54) MOTOR SERVO-DRIVE FOR HIGH PERFORMANCE MOTION CONTROL

(71) Applicant: ACS Motion Control Ltd., Midgal HaEmek (IL)

(72) Inventors: Ze'ev Kirshenboim, Kiryat-Tivon (IL); Boaz Kramer, Afula (IL); Vladimir Kogan, Kiryat-Bialik (IL)

(73) Assignee: ACS Motion Control Ltd., Migdal HaEmek (IL)

( * ) Notice: Subject to any disclaimer, the term of this patent is extended or adjusted under 35 U.S.C. 154(b) by 4 days.

(21) Appl. No.: 14/532,023

(22) Filed: Nov. 4, 2014

(65) Prior Publication Data

US 2016/0098019 A1    Apr. 7, 2016

(30) Foreign Application Priority Data

Oct. 6, 2014  (IL) .......................................... 235022

(51) Int. Cl.
| G05F 1/10 | (2006.01) |
| G05B 11/32 | (2006.01) |
| H02P 6/16 | (2016.01) |
| G05B 11/01 | (2006.01) |

(52) U.S. Cl.
CPC .............. *G05B 11/32* (2013.01); *G05B 11/011* (2013.01); *H02P 6/16* (2013.01)

(58) Field of Classification Search
CPC . B60L 15/2045; G01P 21/00; G01R 33/0035; H02J 13/0079
See application file for complete search history.

(56) References Cited

U.S. PATENT DOCUMENTS

2002/0116100 A1* 8/2002 Shimazaki .......... B60L 11/1807
701/22

* cited by examiner

*Primary Examiner* — Karen Masih

(57) ABSTRACT

A servo-drive system for feedback-based control of motion and positioning of a motor comprises a current measurement device that obtains a measure of current being drawn by the drive motor from which to provide feedback. The current has an operating range which is made up of a relatively large current range for acceleration but remains within a relatively smaller current range for steady state operating of the motor. The current measurement device has a first, coarse, sensor optimized for measuring the relatively large current range and a second, fine, sensor optimized for measuring the relatively smaller current range, thereby to maximize feedback accuracy during steady state operation.

25 Claims, 8 Drawing Sheets

MOTOR SERVO-DRIVE FOR HIGH PERFORMANCE MOTION CONTROL

RELATED APPLICATION

This application claims the benefit of priority of Israel Patent Application No. 235022 filed on Oct. 6, 2014, the contents of which are incorporated herein by reference in their entirety.

FIELD AND BACKGROUND OF THE INVENTION

The present invention, in some embodiments thereof, relates to improving the performance of motor servo-drives that feed servo-motors with current, and more particularly but not exclusively to improving current sensitivity across a whole current range, even if that range is large. The motor produces force (or torque) and acceleration that are directly related to the current. Better current enables more accurate velocity and position control of servo-motors. The more accurate the output current of the drive (that feeds the motor) follows the command; the more accurate is the velocity and position control of the drive. The improved performance of the drive is achieved by improving the signal to noise ratio of the current measurement especially when the required current is of low level relative to the maximum current that is needed when accelerating the motor, as an example.

It is well known that in order for a motor drive to provide the best performance possible, a closed loop current control method is used. The drive utilizes current sensing circuitry that produces an electrical signal that represents the actual output current of the drive. The measured output current is compared to the desired current command and the error between the two is used by the drive to correct the output current.

It is well known that the correction to the output current is limited by the accuracy of the measurement and the extent that the current measured in fact represents the actual output. Any deviation of the measured signal from the actual output current may produce a false correction by the drive. Such deviations are typically due to quantization noise (or errors), electro-magnetic interference (EMI) from the surrounding electrical circuits and other sources of noise.

It is well known that in order to achieve a high performance velocity and position control of the motor, a closed loop method is used. The actual velocity and/or position are measured and compared to the desired velocity and/or position. The deviation between the desired velocity and the actual measured velocity, the velocity error, or for that matter the deviation between the desired and measured position—the position error—is used as a correction to the command to the motor servo-drive (=drive command). Any noise, say quantization noise, in the motor current may introduce noise into the force or torque that the motor produces and may thus negatively affect how well the actual velocity and the actual position follows the desired velocity and position.

There are two main types of motor servo-drives available: linear drives and switching Pulse Width Modulation (PWM) drives. The drives may operate many types of motors: single phase and multi-phase motors, both of linear and rotary types. The motors may be of any type of motor structure, including DC motors, permanent magnet synchronous motors, asynchronous induction motors, voice coils, stepper motors, etc. There are some differences between linear drives and PWM drives in particular which are now summarized.

It is well known that linear drives suffer from low efficiency relative to a PWM type of drive with the same output power capability, and therefore the linear drive dissipates a significant amount of heat by comparison. The linear drives are relatively bigger and typically more expensive. Linear drives are also quieter than PWM drives, producing less electromagnetic noise that affects the current sensing circuitry. As a result linear drives are able to feed the motor with current that better replicates the desired current, over a wider range of currents, especially when low level of currents are needed for delicate velocity and position correction.

There are numerous high accuracy positioning applications that require a combination of high dynamics, accelerations (in the order of a few g) of large mass or inertia, and therefore high currents, with low standstill position jitter, that is to say deviations from the desired position at standstill, of a few nanometers and below a nanometer, and a following error of a few nanometers and below while moving at a constant speed, when very low level of currents are required just for correction of such small errors.

Examples of such applications include wafer inspection and metrology systems that utilize high accuracy positioning tables, both of air-bearing type and mechanical bearing types. Such positioning stages may include systems with a single linear motor and position feedback, and also gantry axis systems, which utilize two motors and two position feedbacks per each gantry axis. State of the art wafer inspection and metrology systems require standstill jitter at nanometer and sub-nanometer levels, and following errors while moving at a constant speed of a few nanometers. Such applications, or similar, also use high accuracy rotary positioning tables that require a combination of high accelerations of a relatively high inertia and therefore high currents and low standstill jitter of a few micro degrees and below.

For positioning applications that demand a combination of high dynamics and nanometer and sub-nanometer, or microdegree and sub-microdegree, standstill jitter and low following error, during constant velocity or at standstill, the only viable servo-drive in the current art is the linear drive. More particularly, existing PWM servo-drives are typically not used in applications that require jitter and following errors during standstill, of less than about 10 nanometers. At constant velocity the following error that can be achieved with PWM drives is typically worse.

SUMMARY OF THE INVENTION

The present embodiments are applicable to PWM and to linear drives, as well as to other forms of drive. When applied to PWM drives they may endow the PWM drives with performance comparable to the performance of an equivalent linear drive, and when applied to the linear drive, may endow the linear drive with a performance not achievable with the known art of linear drives.

As explained, some positioning applications require using drives with high current range. The required motor current during a transition state, such as an acceleration may be thousands of times the current during a steady state phase, when not accelerating, that is when standing or when moving at a constant velocity. Indeed the steady state required current may be close to zero.

It is noted herein that the term "acceleration" refers also to deceleration, which may be regarded as negative acceleration. The term "acceleration' also refers to correcting accelerations needed to overcome large disturbances.

More generally, high currents are needed when high force is needed, such as during transition states of acceleration and deceleration and when high disturbance is encountered.

The current measurements carried out during the steady state phase by a sensor that is calibrated to cover the whole current range produces an electrical signal that represents the actual current, that is smaller than the electrical noise that is picked by the sensor and the measurement circuit. Embodiments of the present invention may thus use separate current sensors and measurement circuits, a first sensor and measurement circuit for measuring high currents (coarse measurement) and a second sensor and measurement circuit for measuring low currents (fine measurement) in order to obtain a combination of both large range of currents with the same signal to noise ratio and resolution as with the current art using a single sensor, and low level currents, with higher signal to noise ratio and higher resolution. The separate measurements improve position jitter and following errors. The result is a drive that provides improved velocity and positioning accuracy. When applying the present technique of coarse and fine measurements to a PWM drive, the PWM drive provides the same or better performance than an equivalent linear drive with a single current measurement sensor and it thereby allows the PWM drive to be used in place of a linear drive in a high current range, high accuracy application. Alternatively, the same technique of coarse and fine measurement may be applied to a linear drive to further improve its characteristics and thus achieve even better standstill jitter and following errors when compared to an equivalent linear drive with a single current measurement sensor.

Whenever the term servo-drive is used herein, it may be a servo-drive for a single phase or a multi-phase motor with one or more current feedback measurements. The method of coarse and fine measurement may be applied to one or more of such feedback measurements. The present embodiments may alternatively relate to a current and to a current vector.

The present embodiments may more generally apply to any kind of actuator and to any measurable feature that may be measured to form part of the control of the actuator. Wherever there is a large range to the feature and a low level range is required for the steady state the two ranges may be measured separately by dedicated sensors.

In addition to measuring feedback signals the same treatment may be applied to an externally supplied command signals for the drive of any actuator. For the low part of the range of the command signal it may be amplified and the amplified signal may be used to give more accurate control over the low part of the range.

According to an aspect of some embodiments of the present invention there is provided a servo-drive system for feedback-based control of motion and positioning of a motor, comprising:

a current measurement device configured to obtain a measure of current being drawn by the drive motor, therefrom to provide the feedback;

the current having an operating range, the operating range comprising a relatively large current range for acceleration but remaining within a relatively smaller current range for steady state operating of the motor, the current measurement device having a first, coarse, sensor optimized for measuring the relatively large current range and a second, fine, sensor optimized for measuring the relatively smaller current range, thereby to maximize accuracy for the feedback during the steady state operation.

An embodiment may comprise a sampler for sampling the first sensor and the second sensor respectively at a same rate.

In an embodiment, the drive is a pulse width modulation drive, or a linear drive or any other suitable drive.

In an embodiment, the motor may be a single phase motor, a direct current motor, a multi-phase motor, a three-phase motor, an alternating current motor, a two-phase motor, a linear motor or a rotary motor or any other suitable motor.

An embodiment may switch on the second, fine, sensor when motor current is below a predetermined threshold, and electrically short the second fine sensor when the motor current is above the predetermined threshold.

The sensors may comprise resistors, current mirror circuits, transformers, Hall-effect based current sensors or any other suitable sensor.

The drive may be for a motor having a single phase and the first and second sensors may be applied to one current measurement of the motor.

Alternatively, the drive may be for a motor having a plurality of phases, and the first and second sensors may be provided for at least one current measurement of the motor. Typically a sensor pair may be provided to one, some or all phases of the motor.

In an embodiment an external controller may be used to generate an analog current command, the drive connected to receive the analog command from the external controller. The drive obtains or provides fine and coarse measurement of the analog command.

The drive system may generate one or more current commands for control of the motor, and may select one of the first and second sensors based on the one or more current commands. The drive may obtain the fine measurement of the analog command by amplification thereof and may select between the command current before and after amplification.

The second, fine, sensor may use an output measurement range which is larger than that used by the first, coarse sensor.

The drive system may use offset compensation and gain mismatch compensation for measurements of the fine and coarse sensing, the compensation provided in sensing pairs, thereby to improve either or both of the feedback and analog command signals.

According to a second aspect of the present invention there is provided a method for current control of a servo-drive for feedback-based control of motion and positioning of a motor, comprising:

obtaining a measure of current into the motor;

providing the measure to provide the feedback, the current having an operating range, the operating range comprising a relatively large current range for acceleration but remaining within a relatively smaller current range for steady state operating of the motor, the obtaining the current measure comprising taking a first, coarse, measure of the relatively large current range and a second, fine, measure of the relatively smaller current range, thereby to maximize measurement accuracy during the steady state.

According to a third aspect of the present invention there is provided a servo-drive for feedback-based control of motion and positioning of a motor, comprising:

a coarse command input for receiving an externally generated command signal as a coarse command;

an amplifier for amplifying the externally generated command signal;

a fine command signal output of the amplifier for receiving the externally generated command after amplification as a fine command signal;

the command having an operating range, the operating range comprising a relatively large range for transition states but remaining within a relatively smaller range for steady state operating of the motor, the servo drive comprising a switch for connecting the coarse command when the command is above a predetermined threshold and connecting the fine command when the command is below the predetermined threshold, thereby to maximize accuracy for the command during the steady state operation.

According to a fourth aspect of the present invention there is provided an actuator system with feedback-based control of motion and positioning, comprising:

a measurement device configured to obtain a measure of a controllable feature of the actuator, therefrom to provide the feedback;

the feature being a measurable feature having an operating range, the operating range comprising a relatively large range for transition states but remaining within a relatively smaller range for steady state operating of the actuator, the measurement device having a first, coarse, sensor optimized for measuring the relatively large range and a second, fine, sensor optimized for measuring the relatively smaller steady state range, thereby to maximize accuracy for the measurable feature during the steady state operation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
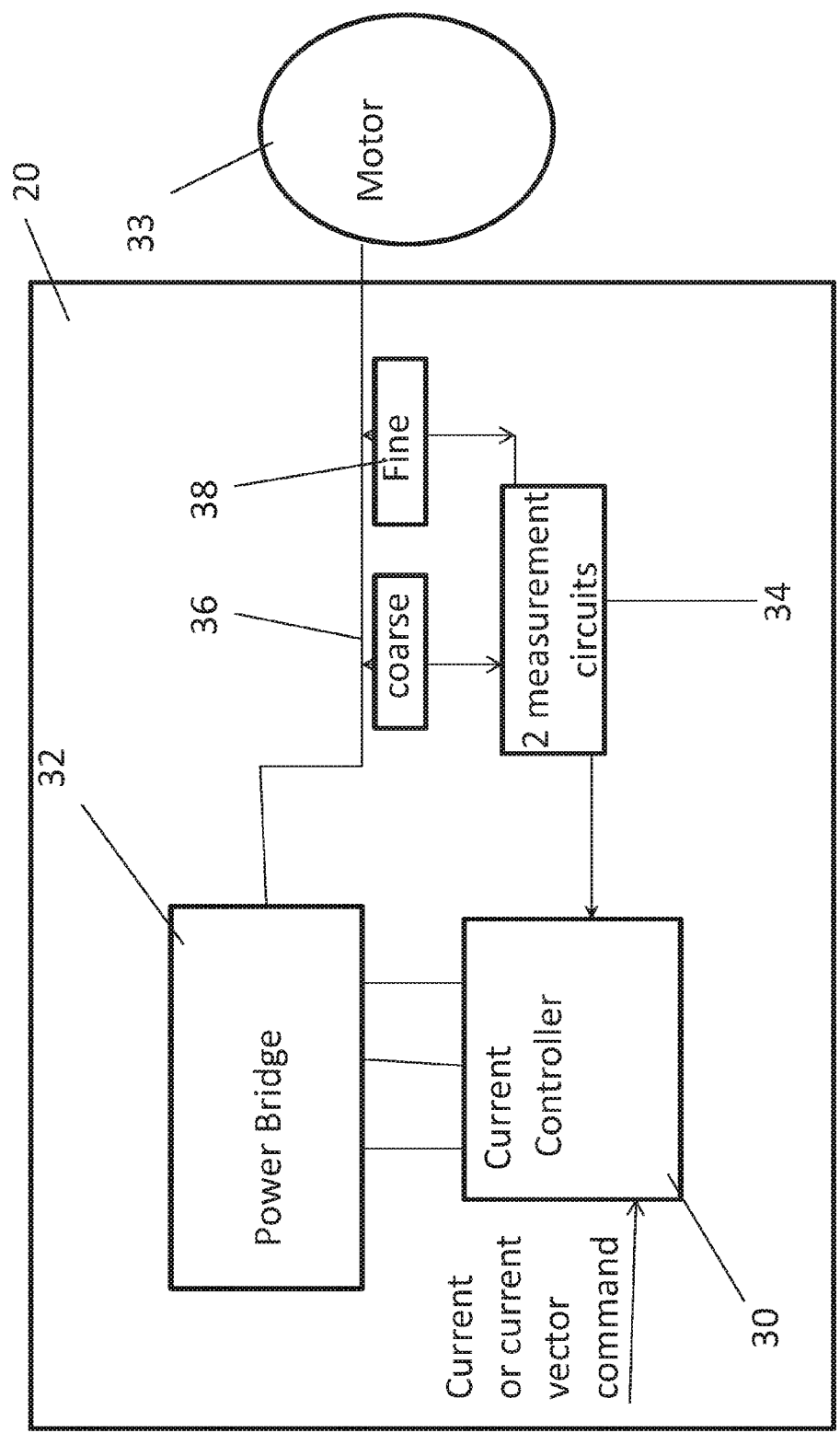
FIG. 1 is a simplified block diagram of a servo-drive according to an embodiment of the present invention.

The present invention, in some embodiments thereof, relates to improving control of the motor current by implementing a method for measurements of the current of the motor over a wide current range. Sensitivity to noise may be improved over the current range, and specifically over low current levels, leading to better position and velocity control.

High performance velocity and position control systems utilize close loop feedback. The actual velocity and/or position may be measured and compared to the desired velocity and/or position. The deviation between the desired velocity or position and the actual measured velocity or position, the velocity or position error, is used to create a current command or a current command vector to the motor servo-drive, the drive command. As explained the servo-drive produces current that feeds the servo-motor, alternatively known as the motor current.

The present embodiments may improve measurements of the motor current, which enables more accurate current control, which in turn enables more accurate velocity and position control.

In general, positioning applications require a wide current range and therefore a wide range of sensitive current feedback measurement. High levels of currents are used when accelerating and decelerating as an example. Currents that are relatively very small are used during standstill and during constant velocity. The present embodiments provide a current measurement method which may represent the actual current more accurately and with higher signal to noise ratio when the current values are low. Additionally a drive command measurement method may be provided, particularly for a case in which a drive command is generated by an external controller.

The minimal value of current that can be controlled may be determined in a given system by the level of electrical noise from surrounding circuits that is added to the electrical signal of the current measurement sensor and measurement circuit, by offsets and by the minimal value that an Analog to Digital Converter (ADC) can sample due to its finite resolution (=quantization noise or error). The noise and error in the sampled signal results in a noisy and erroneous current and causes a noisy uncontrolled fluctuation in the velocity and in position relative to the desired velocity and desired position (=velocity error, position error).

Using command with resolution (free of noise) that is higher than the noise free resolution of the feedback has marginal improvement, if any, over a command with resolution that is equal or a bit higher than the noise free resolution of the feedback.

Linear drives produce less electrical noise than equivalent, that is similar voltage and current range, PWM drives, and thus with the same range of current and current feedback measurement, with the linear drives it is possible to achieve a more refined current and as a result a smaller velocity and position errors. Typically, linear drives are commanded by current command with higher resolution to take advantage of the better effective higher resolution (noise free) feedback. In the present embodiments, two current measurement devices are used, one to measure high currents above a set threshold and one to measure low currents that are below such threshold. This two measurements method is in fact applicable for any type of drive, both for PWM and for linear drives.

The controller may decide automatically which of the two measurements to use at any given time, as will be explained below. The low current sensor is designed so that at low current the output of the low current sensor is much higher for a given current than the output of the high current sensor for the same current. As an example, for 1 Amp of current, the output of the low current sensor is 1 Volt and the output of the high current sensor for the same 1 Amp is 20 times smaller—0.05 Volt. The imperfections (including noise, offsets and quantization errors) that are added to both measurement signals are of the same level and as a result, actual currents that are 20 times smaller may be accurately measured and used for control, thus controlling currents that are 20 times smaller than is possible by using only one current sensor for the whole range of required currents. Furthermore, the negative effect of offsets in the analog signal measurements, may also be reduced in the fine, or low current, measurement. Small offsets may provide high performance—especially with multi-phase motors during constant velocity moves. Offsets in currents cause the motor to generate undesired fluctuations of force/torque, thus causing deterioration in constant velocity performance. Though offsets may be compensated for, the compensation is never perfect. The effect of offsets on the fine measurement is considerably smaller, in the given example, about twenty times smaller.

The same idea applies also to the command signals to a drive if the commands are analog signals. Again the concept applies both to linear and to PWM drives. Since the noise content in the current feedback that is generated by prior art PWM drives is relatively high when compared to linear drives, the command resolution has not to date been a limiting factor. When the noise in the current feedback is reduced, the useful resolution is higher, and then combining with higher resolution commands becomes relevant in order to realize the improvements offered by the better signal to noise ratio feedback when the currents are of low level.

The same idea may be applied to any kind of drive of any actuator and any measureable feature, such as current, voltage, pressure etc., that can be measured to provide control, where the feature has a range of which a low part of the range is used during steady state and the performance may be improved by increasing the noise free resolution of the measurement in the low range.

Returning to the case of the servo-drive, the motor produces force (linear motor) or torque (rotary motor) that is directly related to the current command, or current command vector in a multi-phase motor. The motor drive purpose is to push current to the motor in a controlled manner. The actual current should be as closed as possible to the desired current. To achieve that goal a closed loop control method is used. The actual current is measured and compared to the (desired) current command and the error between the two is used to modify the current response output of the drive. Any deviation in the actual current from the desired current may cause undesired fluctuations in the force or torque of the motor and as a result, deviations in acceleration, in the velocity (=integral of acceleration) and in the position (=integral of velocity).

In computer based digital closed loop control systems as well as in analog closed loop control systems, how well the actual current follows the command significantly depends on the quality of the current measurement. Among others, the quality of the electrical signal that represents the actual current measured is affected by:

a. The electrical random noise that is added by the surrounding circuits; and b. The quantization noise (or error) due to sampling the measurements by a finite resolution analog to digital converter.

c. Offsets in electrical circuits. (Offset of a circuit is the average value of the output when the input is zero and the average output is supposed to be zero as well).

Current noise and error cause noise and error in the force or torque of the motor and as a result, noise and error in the actual acceleration, in the actual velocity and in the actual position.

Many servo controlled positioning systems require moving as fast as possible from one position to another and the smallest velocity error and position error possible during steady state. The fast move dictates high acceleration and therefore high force or torque and therefore high current. The maximum current needed is defined in a given system by the maximum acceleration. When moving at constant velocity, or standing still, the need is for small current, just enough for the motor to produce force or torque to overcome friction and other disturbances. The higher the resolution and accuracy of low level current that can be produced and controlled, the higher the resolution and accuracy of force or torque that that the motor produces, which enables to overcome smaller disturbances achieving smaller standstill jitter and following errors. Therefore many servo controlled positioning systems require a combination of high current to move fast, and high resolution and high accuracy low current to minimize the steady state velocity and position errors. The maximum current defines the high current range (from zero to the maximum) and the maximum current that is needed during constant velocity and when standing to overcome friction and other disturbances defines the low current range which is a subset of the high current range.

The minimum useful current measurement signal is defined by the noise component in that signal.

The following relates to a given system, and the improvements shown are for that system. For other systems the specific numbers will be different but the principle applies. Thus in an example:

a. The maximum current required is 10 A.

b. The output of the current measurement circuit is linearly related to the current.

c. The maximum output of the current measurement circuit is 100 mV (representing 10 A).

d. The noise level (including offset) of that circuit is 0.1 mV.

e. The minimum useful current that can be measured is therefore 0.01 A (=10 A×0.1/100). Below that level, the measurement signal contains mainly noise.

The range of the required current is 0 to 10 A (or in short 10 A). The useful range of current in this example is from 0.01 A to 10 A and the ratio of maximum to minimum is 10/0.01=1, 000, which is equal to the maximum signal to noise ratio (SNR).

The signal is measured by an analog to digital convertor (ADC) with 12 bits clean resolution. It is assumed that the electrical noise in the ADC is included in the noise of the circuit, the 0.1 mV above. The minimal presentation of the ADC output is 100 mV/(4096/2)=0.05 mV representing current equal to 0.005 A. If the actual current, in a noise free signal, is below that level, the ADC will not in fact see the actual current, instead being confused by quantization error or noise. If the noise of the circuit is below the quantization noise, then the quantization noise becomes the limiting factor in the useful range of the current measurement signal.

The present embodiments increase the useful resolution of currents in the low current range by increasing the SNR (Signal to Noise Ratio) of the current measurement signal and by reducing the effect of quantization noise (error) for currents in the low current range. Using ADCs with higher resolution, will not improve the useful resolution of currents in the low range in this example and they are (significantly) more expensive:

In the present embodiments, current is measured twice by two different measurements circuits. One measurement circuit, hereinafter the coarse measurement circuit, measures the whole high current range (zero to 10 A in the example. So 100 mV represents 10 A).

The second circuit, hereinafter the fine measurement circuit, measures currents in the low current range, for example, up to 0.5 A. So 100 mV of measurement output signal represents 0.5 A of actual current. When the actual current is above 0.5 A, the fine measurement second circuit is not used.

When the actual current is above 0.5 A, the signal from first circuit is used for current control. When the actual current is up to 0.5 A, the signal of the second circuit is used.

The coarse and fine measurements may be carried out simultaneously, but in certain embodiments may alternatively be carried at different times.

Both circuits have similar electrical noise. (0.1 mV in the example). Therefore the SNR of the combined signal is twenty times higher when the current is in the low current range and produces noise free signals that represent actual currents that are 20 times lower. The maximum SNR in the example is now 20,000. The minimum useful current that can be measured and produced is now 10/20,000=0.0005 A. As a result the acceleration noise may be 20 times smaller and the position following error and jitter may be significantly smaller.

The above-described system may be applied both to linear and PWM drives. When applied to PWM servo-drives the resulting drive may meet the specifications of high performance applications such as wafer inspection and metrology, where standstill jitter below 1 nanometer and following errors in the order of a few nanometers are required.

In PWM servo-drives, the electrical noise is always higher than in equivalent, that is similar voltage and maximum current, linear drives, and therefore until now there was no point in increasing the PWM command resolution, as it was not a limiting factor. However, with the present embodiments, the PWM command resolution starts to be a limiting factor and thus increased PWM command resolution is provided in some of the present embodiments.

The present embodiments may be provided to linear servo-drives. The linear servo-drives already have very good performance and the improvements provided by the present embodiments may meet newly appearing requirements in fields such as wafer inspection and metrology that require even lower standstill jitter and following errors.

Herein, the term 'drive system' is used to refer to the servo-drive for a motor or actuator, as well as to components external to the servo-drive that may provide command signals, energy and other support that may be required for operation of the servo-drive and motor.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified schematic block diagram illustrating a first embodiment of a servo-drive 20. The servo-drive may be either a PWM type or a linear type. As mentioned above, the invention is not limited to a PWM device, and the same principle of two measurement sensors may be applied to a linear drive and to any other kind of servo-drive. A servo-drive according to the present embodiments may comprise a current controller 30, a power bridge 32, coarse and fine current measuring sensors 36, 38, and corresponding two current measurement circuits 34. The servo-drive may also comprise in addition velocity and position controllers.

A current controller 30 provides control commands for a power bridge 32 that produces current that feeds the motor 33, based on a current or current vector command and on the measured actual motor current (=current feedback).

As explained above, many servo-controlled positioning systems require to move as fast as possible from one position to another, and to achieve the smallest velocity error and position error possible during steady state, and therefore the servo-drive may provide a combination of high current range and high resolution and high accuracy current in a low current range.

Thus the present embodiments provide a measurement unit 34 for the current applied to the motor, in which two separate sensors are used. The first is a coarse sensor 36 to measure currents in the full current range, as needed for example during the acceleration phases and the second is a fine sensor 38, which measures the currents in the low current range as needed for example during the steady state, that is during constant velocity or standstill.

Each of the sensors thus operates in an optimized manner for the particular current range that it is intended for, hence providing improved accuracy specifically over the low current range. Typically the fine sensor operates over a low current range equal to 5% of the high current range, but it can be any other range that is smaller than 100%. The fine sensor is designed so that it produces the maximum signal when the actual current is equal to the maximum current in the low current range and the coarse sensor is designed so that it produces the maximum signal when the actual current is equal to the maximum current in the high current range. As an example, both sensors produce a maximum signal equal to 100 mV. Thus, when the actual current is in the low range, the output signal of the fine sensor is much higher than the output signal of the coarse sensor. For a low current range of 5% of the high current range and for the same maximum signal for both sensors (100 mV in the example above), the output of the fine sensor 36 is 20 times higher than the output signal of the coarse sensor 38.

The noise that affects both measurements is about the same and as a result, the effective SNR of the fine sensor 38 is 20 times greater, thus managing to control currents that are 20 times smaller than is possible by using only one sensor for the whole range of required currents.

The two sensors may make analog measurements, which may then be sampled and digitized for the controller 30, and, in an embodiment, both sensors are sampled simultaneously and at the same rate. In an alternative embodiment the sensors are sampled at different times.

The controller may decide automatically, which of the two measurements, coarse or fine, to use at any given time. The controller samples both measurements and decides which one to use at any given time based on the coarse measurement. If the current is in the low current range, it uses the fine measurement and if the current is above that low current range it uses the coarse measurement. Alternatively, the controller may look at the size of the current command signal or the size of current vector command signal and if the required current is in the low current range, then the fine measurements may be used as feedback. If it is above the low current range, then the coarse measurements are used as feedback. A gain in the control algorithm may be modified to compensate for the different scales of the coarse and fine measurements.

Further improvement in the signal to noise ratio, SNR, of currents in the low current range may be achieved by modifying the resolution of the commands. The present embodiments not only improve SNR but may also reduce quantization errors for currents in the low current range.

The current sensors 36 and 38, may be resistors, or Hall-based current sensors or any other sensor capable of measuring current.

When using resistors as current sensors, the resistance value of the fine resistor is higher than the value of the coarse resistor. In the example above, it is 20 times higher. For an output of 0.1V for 20 A, the coarse resistor value may be 0.005 Ohms. The value of the corresponding fine resistor would then be 0.1 Ohm. When 20 A of current is flowing through the coarse resistor, it may dissipate heat at a rate of 2 W (=20×20×0.005). The fine resistor may dissipate heat at a rate of 40 W (=20×20×0.1). In many applications such a high level of heat dissipation may prevent the usage of such a method, however in one embodiment, the fine sensor is turned off by shorting it, except when the actual current is in the low current range. Thus heat dissipation at the fine resistor is minimized. In the example above, if the low current range is 1 A, the maximum heat dissipation of the fine resistor is 0.1 W (=1×1×0.1).

Furthermore, when using a sensor that dissipates heat that is relative to the size of its output signal, for example a resistor that dissipates heat equal to the current multiplied by the voltage drop on the resistor, which is the output signal, such heat dissipation limits the maximum value of the output signal of the sensor. In the example above with high current range of 20 A, and low current range of 1 A, the 0.1V maximum output signal that represents 20 A is designed in order to limit the heat dissipation of the coarse sensor to 2 W. By shorting the resistor of the fine sensor when it is not used and letting the measured current flow through it only when the current is in the low current range, for the same maximum output signal the heat dissipation is smaller, 20 times smaller in the above example, resulting in only 0.1 W heat dissipation. Therefore it makes it possible to select a resistor for the fine sensor that generates a higher signal for the maximum current in the low current range and therefore further improving the SNR of the fine sensor output signal. By selecting a fine sensing resistor of 0.2 Ohm instead of 0.1 Ohm in the above example, the output signal for a given current is 2 times higher and thus increases the SNR of that signal by an additional factor of 2, while the maximum heat dissipation is increased to only 0.2 W, adding only 10% to the heat that the coarse resistor dissipates or to the heat that a single sensor of the current art dissipates.

The maximum output signal of the fine sensor may be designed to be higher than the maximum output signal of the coarse sensor, thus further increasing the SNR of the fine sensor output signal.

As discussed in greater detail below in respect of FIG. 4, the current measurement device may be provided in series with the motor. If the motor is a multi-phase motor then the fine and coarse sensors may be provided for one or more phases of the motor.

Figure 5:
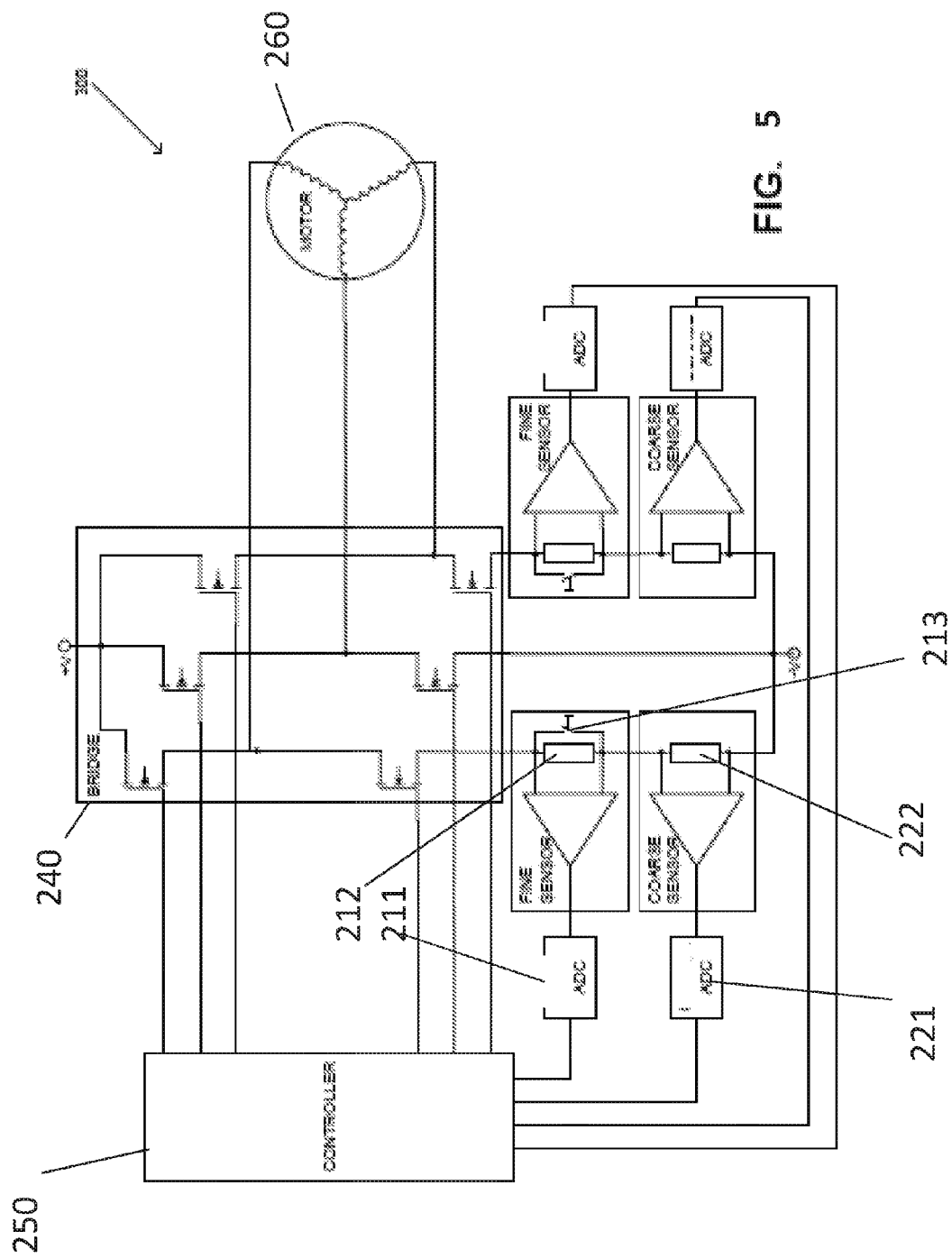
FIG. 5 is a schematic circuit diagram of a servo-drive for three phase motor according to an embodiment of the present invention with coarse and fine current measurement in which sensing is carried out on the negative power supply side of the power bridge.

In the alternative embodiment of FIG. 5, the current measurement device may be located between the bridge and the negative power supply node.

The current measurement device may also be located between the bridge and the positive power supply node.

Figure 6:
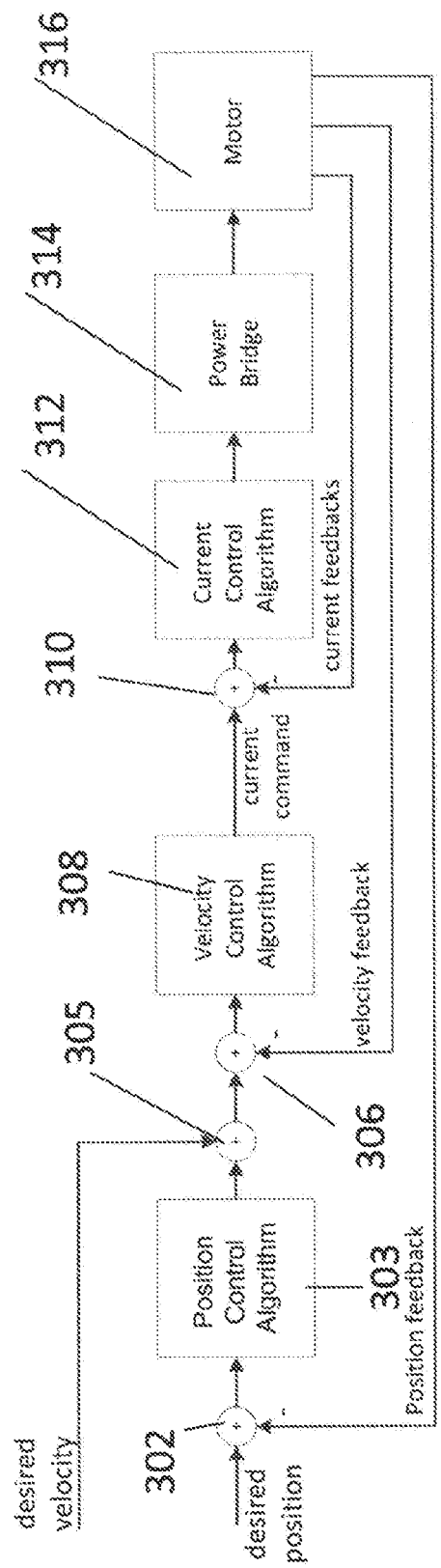
FIG. 6 is a schematic block diagram illustrating a complete control system and generation of a current command or a current vector command.

The current controller 30 may use a required current command or current command vector to operate power bridge 32 and thereby generate the currents for the motor. FIG. 6 herein below shows how the current command, used as an input for controller 30, may be generated.

The controller can be calibrated to optimize for offsets in the measurements and for deviations in the ratio of fine to coarse from the desired values, as will be explained below.

Figure 2:
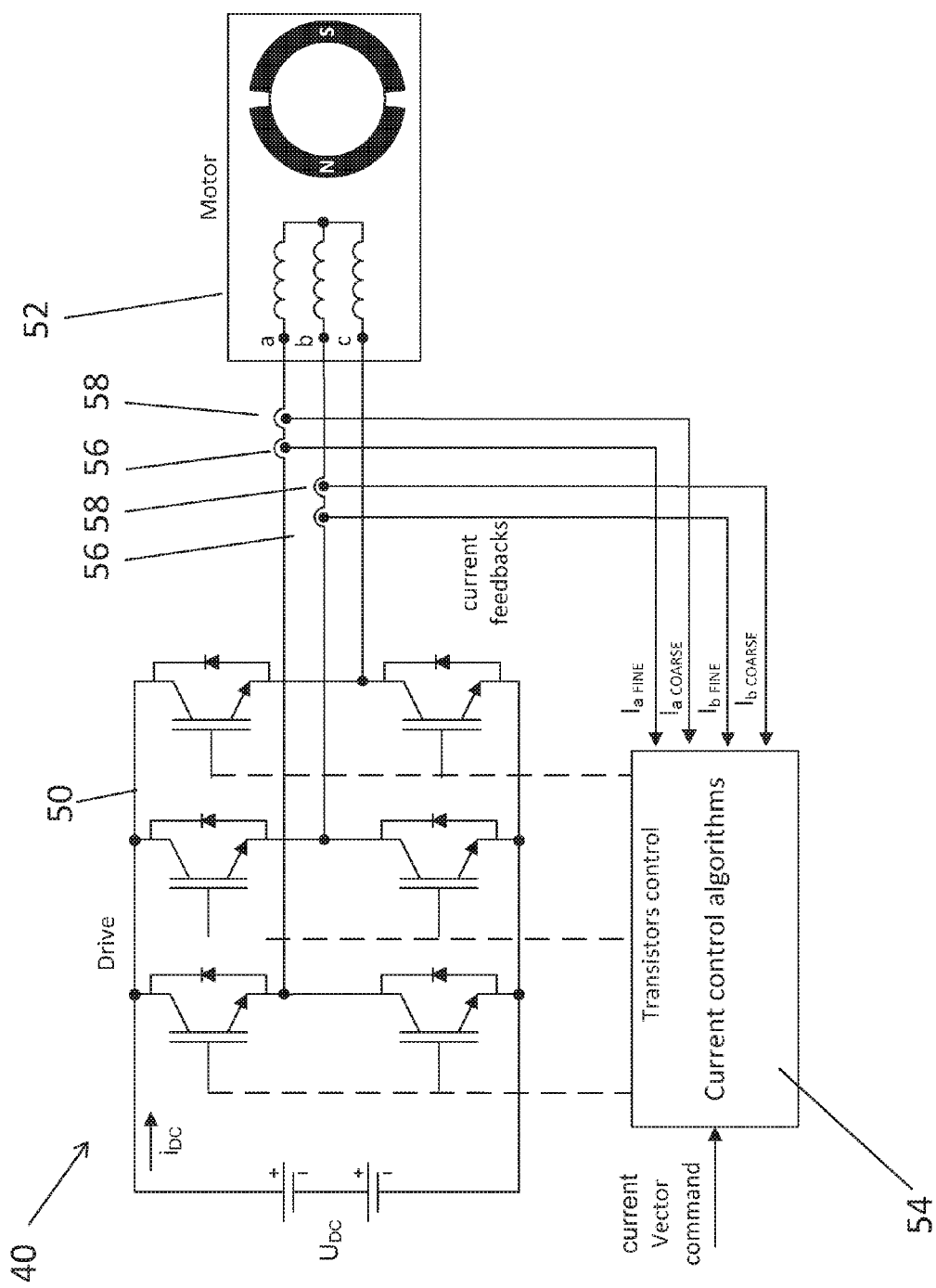
FIG. 2 is a simplified circuit diagram showing an implementation of the embodiment of FIG. 1 for a three phase motor.

Reference is now made to FIG. 2, which is a circuit diagram showing an implementation of the servo-drive embodiment of FIG. 1.

In FIG. 2, a servo-drive 40 comprises a power bridge 50 and operates three-phase motor 52. The schematic applies to PWM as well as linear type drives. Current controller 54 receives a current command. The current into the motor is measured for at least two of the three phases and both coarse 56 and fine 58 sensors are provided for each current. Controller 54 compares signals which are calculated based on the measured currents with the current commands to modify control signals to the power bridge 50 which in turn generates the required currents in the motor 52. In case of a PWM drive the transistor control signals are PWM switching signals that are used to switch the transistors of the power bridge on and off. In case of a linear servo-drive the transistor control signals are analog signals that are used to control the voltage over each transistor and the current flow through each transistor in a continuous manner.

Figure 3:
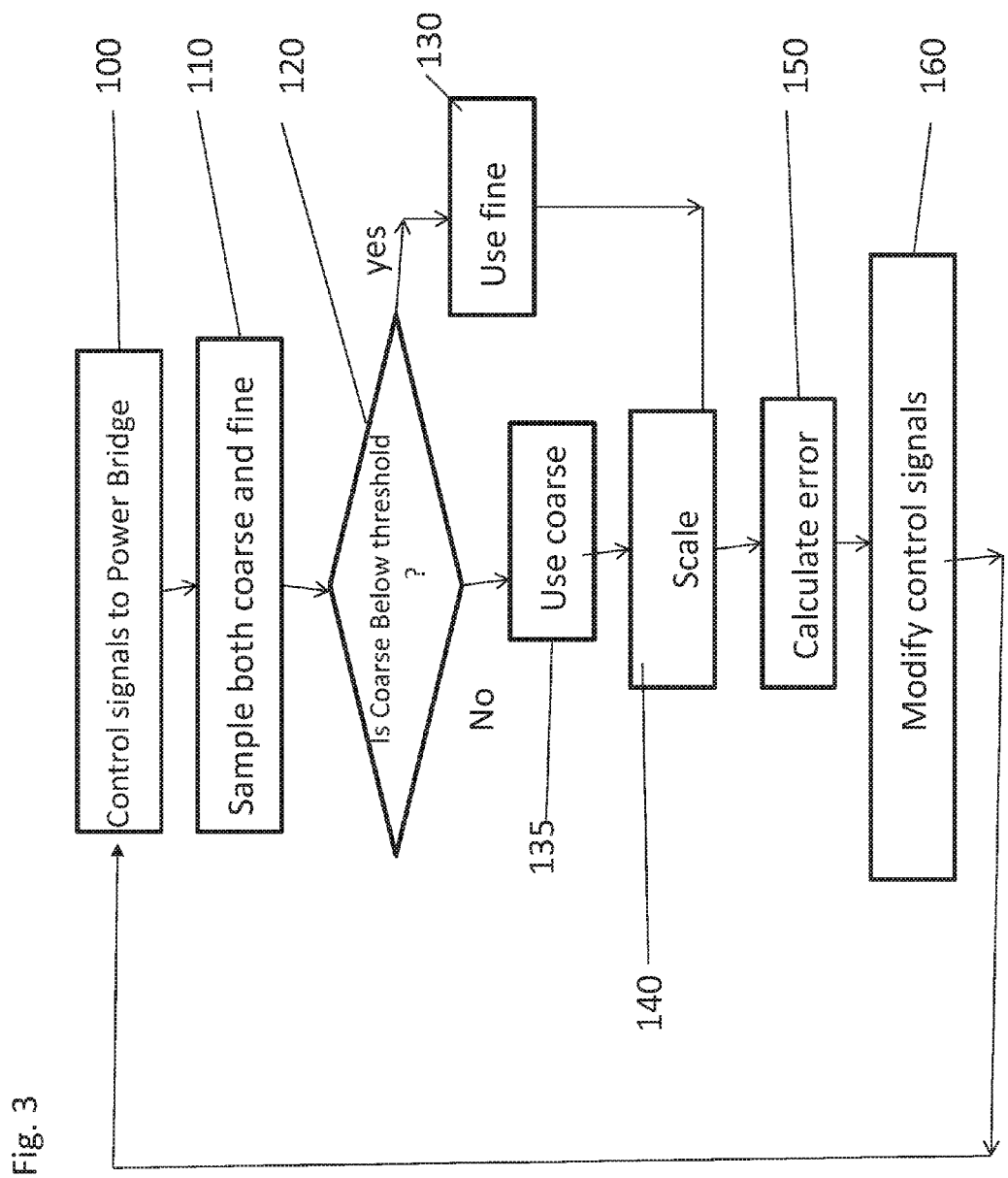
FIG. 3 is a flow chart of operation of the device of FIG. 1.

Reference is now made to FIG. 3, which is a simplified flow chart illustrating a method of improving the accuracy of feedback in a servo-drive using coarse and fine measuring sensors.

The sensors provide measurements for a control loop as discussed, and control signals are provided to the power bridge in stage 100. In stage 110 both coarse and fine measurements of current are sampled. In stage 120 the coarse measurement is compared with a threshold. If below the threshold then the fine current measured in stage 130 is used. If it is above the threshold, the coarse measurement is used—135. In stage 140 the output measurement is scaled according to which of the two sensors has been used. In 150 the error between the selected current measured signal and the desired signal is used to modify 160 the control signals to the power bridge.

The method of FIG. 3 may provide a method of operating a servo-drive that provides better current control. Using the method of FIG. 3 may enable smaller currents to be provided to the motor with finer noise free resolution. As explained herein, the finer and more accurate current allows for finer position and velocity control with lower stand standstill jitter and following errors.

A PWM servo-drive that uses the coarse and fine measurement method, according to one embodiment of the present invention, may produce low current with resolution free of noise that is equal or better than that which a linear drive of similar maximum current and voltage specifications with a single current measurement may produce and therefore such a PWM servo-drive may replace linear drives with single current measurement method in applications that until now have used only linear drives to achieve the position and velocity performance needed. For example, applications that require a combination of both high acceleration and therefore high current and at the same time position standstill jitter and position following errors of a few nanometers and below, and therefore high resolution noise free low current, may use a PWM servo drive of the present embodiments. Such applications include modern wafer inspection and metrology systems. These applications have to date been restricted to linear drives due to inability of the PWM drives to provide the necessary low jitter and following error requirements. The use of PWM drives in these applications may eliminate or reduce disadvantages associated with linear drives in these applications such as lower efficiency, higher heat dissipation, larger size and higher costs.

As discussed, a limiting factor with the servo-drive is that the range of the required current is high. To achieve the required dynamics for the motor and provide the accelerations needed, there is a need for high maximum current, for example 20 A. While standing or moving at constant speed, the required current is much smaller, and may merely be required to overcome friction and other disturbances, for example, below 1 A. In such a system that uses single current measurement to cover the whole range of 20 A, the SNR ratio for a current of 1 A is 20 times lower, or worse, than for a system with a maximum current of 1 A, since the system is designed to cope with the full 20 A current range.

The present embodiments thus separate out the operation of the motor between a high current range part, above 1 A and up to 20 A in this example, and a low current range, below 1 A in this example. As the low part of the range is treated separately, an SNR may be achieved for that part of the range, which is as good as for a system whose maximum current is equal to the low current required during standstill or constant velocity, (1 A in this example).

The present embodiments improve the SNR ratio by treating the coarse and fine states separately and also makes an increase in the resolution of the servo-controller commands effective when the current command is for current in the low range. The greater command resolution combined with the coarse and fine measurements may make a significant contribution to the results.

As explained, a high resolution current feedback measurement uses two sensors per each current that needs to be measured, one for coarse measurement of the full current range and one for fine current measurement when the current is low, below pre-defined threshold. The fine sensor is used for currents in the low current range, which as an example may be equal to 5% of the high current range (5% range) and the coarse sensor is used for feedback when the current is in the range of 5% to 100% of the high current range. Both are sampled by an analog to digital converter, ADC, with a specific resolution, for example a 16 bit resolution ADC, with 14 bits resolution free of noise. In such an example the SNR for currents in the low current range may increase by a factor of 20, that is more than 4 bits, and therefore enables effective resolution free of noise of an additional 4 bits to reach a total of 18 bits.

Using a higher resolution ADC (18 bits) and using one sensor provides an inferior result, as such a solution does not improve the SNR of the measured signal itself, and in any event can be significantly more expensive.

In general, noise generates force or torque that that causes among others jitter and following errors in the steady state condition, and the present embodiments may reduce the jitter and following error significantly in this way.

The measuring sensors may be low resistance resistors, or other sensors, such as Hall based current sensors, current mirror circuits and more.

Heat generation by the fine measurement sensor, by a resistor as an example, can be significantly reduced, for example by shorting of the fine sensor when it is not used and the coarse sensor is used for feedback. To short the sensor a transistor or one or two diodes may be used or other known methods to limit the voltage drop across the sensor or to prevent the high motor current to flow through it when the fine measurement is not used.

High resolution PWM command generation is an existing technology. However, as discussed above, it is not that useful if the current feedback resolution and SNR is not improved. That is to say, no matter how good the PWM command resolution, its effectiveness is limited by the noise level in the current feedback signals. The combination of the present two-channel feedback measurement with increased PWM command resolution can lead to significant improvements.

Figure 7:
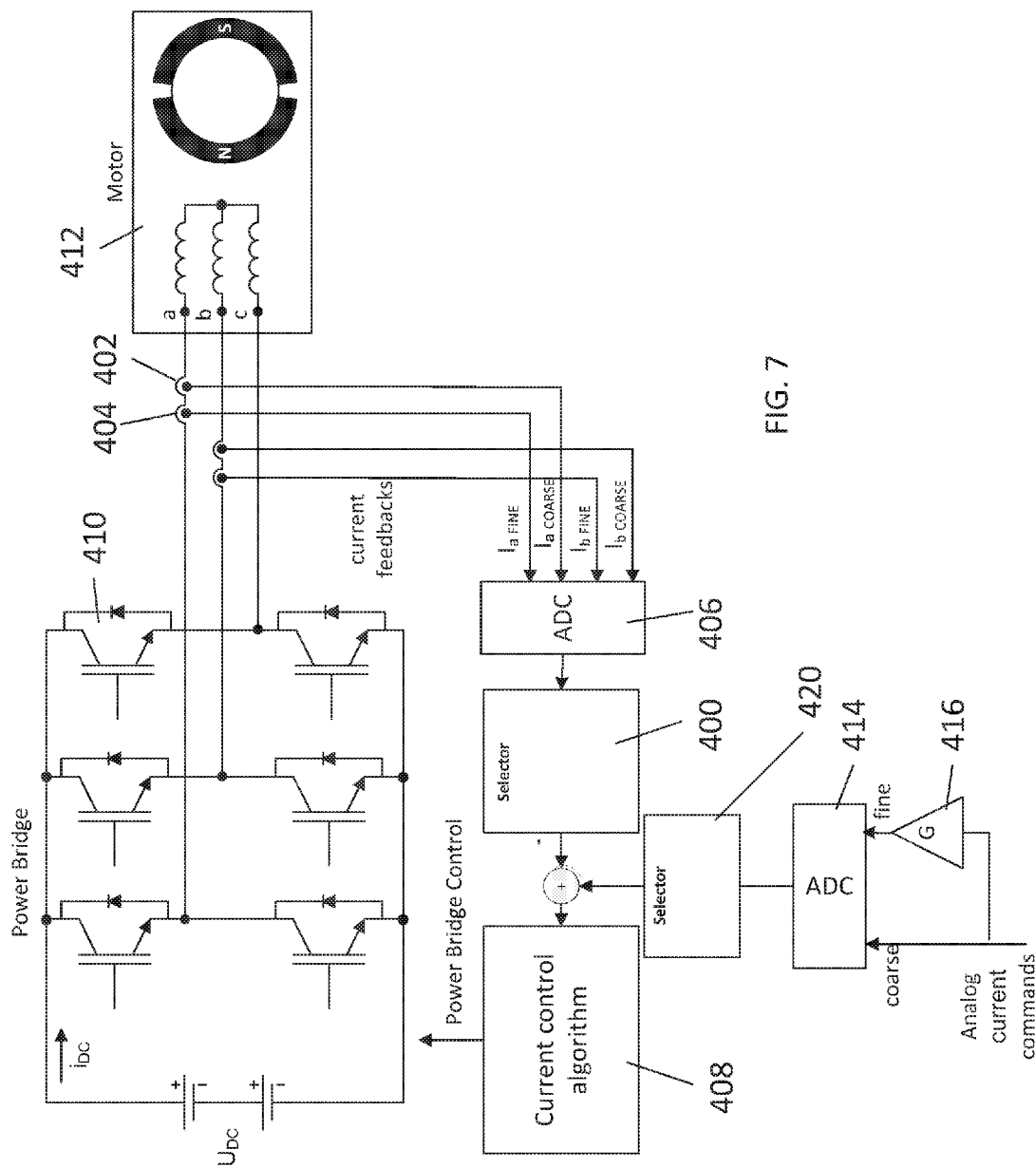
FIG. 7 is a schematic block diagram showing an embodiment of the present invention in which the current command is generated externally of the drive and provided to the drive as an analog signal.

In another embodiment of the servo-drive according to the invention, the current command is analog and is sampled by a finite resolution ADC, as shown in FIG. 7 herein below. The command is measured twice, once as is (coarse) and once after amplification by a factor greater than one (fine). A factor of 20 is given as an example. The coarse command is used when the command is high (5% to 100% of the maximum current in this example of factor 20) and the fine command is used when the command is in the range of up to 5% of the maximum current. By amplifying the command as close as possible to the location in the circuit where the command signal enters the servo-drive, by a factor of 20 in this example, the impact of the noise that is added to the signal between the point of entry to the servo-drive and the sampling circuitry is attenuated significantly, improving the SNR of the command signal which enables command currents with finer more useful noise free resolutions.

It is noted that although the above has been described in terms of a signal that is digitized, the present embodiments may also be analog, and the ADCs no longer being required.

Figure 4:
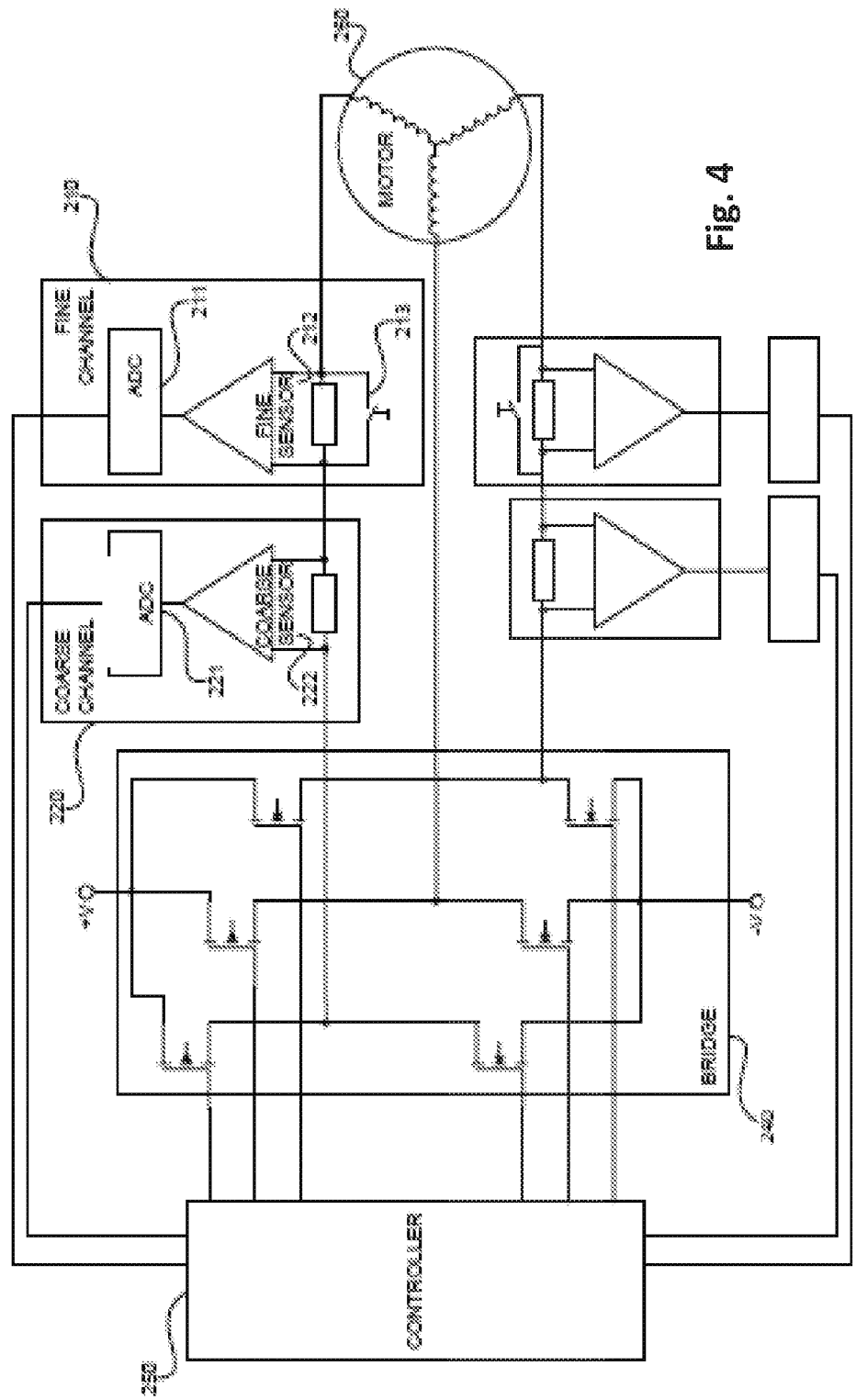
FIG. 4 is a schematic circuit diagram of a servo-drive for three phase motor according to an embodiment of the present invention with coarse and fine current measurement in which sensing is in series with the phases of the motor.

Reference is now made to FIG. 4 which is a simplified circuit diagram showing a current measurement feedback loop where the current measurement is taken in series to the motor phase. It is noted that bridge 240 may consist of any suitable switch, including FETs, BJTs and other electronic switches. In FIG. 4, power bridge 240 is connected to the three phases of a motor. For each of two motor phases there are two current measurement sensors, a fine sensor 212 and a coarse sensor 222, to measure the current of the motor. The fine sensor is sampled by fine channel ADC 211, and the coarse sensor is sampled by coarse channel ADC 221. ADC 211 and 221 may be one physical ADC with two sampling channels or more. The two sampled signals are fed back to controller 250. Controller 250 then provides control outputs to the bridge 240 that modify the current through the motor 260.

As illustrated, the coarse and fine sensors involve resistors placed in series with the motor, however other kinds of sensors such as Hall-based current sensors may be used instead, as mentioned.

As illustrated, the fine sensor may be shorted using switch 213, to avoid unnecessary heat dissipation.

The same measurement arrangement is provided for a second phase, as illustrated. Likewise the measurement arrangement may be provided for the third phase, although not illustrated.

Reference is now made to FIG. 5, which is a simplified circuit diagram showing an alternative current measurement type where the current measurement is implemented between the bridge and the negative terminal of the power supply. Parts that are the same as in FIG. 4 are given the same reference numerals and are not described again except as needed for an understanding of the present embodiment. In FIG. 5, a power bridge 240 is connected to the three phases of motor 260. A fine sensor 212 and a coarse sensor 222, to measure the current are placed between the lower transistors of the bridge and the power supply negative terminal. In general, sensing locations are specific to the kind of motor being used and measurement is of any current that can provide useful feedback for control of the motor. The fine sensor is sampled by fine channel ADC 211, and the coarse sensor is sampled by coarse channel ADC 221. The two sampled signals are fed back to controller 250. Controller 250 then provides control outputs to the bridge 240 that modify the current through the motor 260. As before, the coarse and fine sensors involve resistors placed in series with the current, however other kinds of sensors such as Hall-based current sensors may be used instead. As illustrated, the fine sensor may be shorted out by switch 213 to provide the embodiments of FIG. 4 and FIG. 5. The measuring resistors may alternatively be placed between the upper transistors and the positive terminal of the power supply.

As explained above, the decision of using either the fine current measurement or the coarse current measurement for feedback may be based on the coarse measurement exceeding or not exceeding a threshold. Alternatively, the size of the current command as produced by the controller to operate the motor may be used.

It is noted that the channel used may be selected at the controller and thus is not necessarily connected with shorting or otherwise switching off the sensors on the circuit board. Switching off the sensors relates to power efficiency and minimization of heat, whereas selecting the measurement to use relates to which sensor is currently picking up the most useful measurement.

Reference is now made to FIG. 6, which is a simplified diagram that illustrates among others the generation of a current command. Desired position and velocity commands are provided by a motion controller (not shown). The desired position is compared to the motor position feedback in subtractor 302 and the resulting difference is applied to a position control algorithm 303, for example a PID algorithm, to provide a command signal for the velocity control 308. The position feedback may be the motor position or the load position, as measured by a position sensor. The desired velocity command may be added via adder 305 to the output of the position control algorithm. The output of adder 305, together with a feedback motor velocity are provided to subtractor 306 and the resulting difference provides a velocity error, which is fed to velocity control algorithm 308. The velocity feedback may be measured on the motor, say from a velocity sensor or calculated from the position feedback. The output of the velocity control algorithm 310 is the current command to the motor.

The current command is then provided to subtractor 312. Current feedback from the motor is subtracted from the current command at subtractor 310. The current feedback is based on the motor current measurements. The result is provided to current control algorithm 312 which provides voltage commands, in PWM form or in analog form based on a control law such as PID, to the power bridge 314. The power bridge generates the phase currents for the motor 316. As discussed, the motor may be a rotary or linear motor, single-phase or multi-phase, direct-current or alternating-current.

In embodiments, one digital processor within the servo-drive executes control, including position, velocity, current etc, and in such a case the current command is generated internally by such a digital processor.

In other embodiments, one digital processor executes position control and optionally also velocity control as well but no more, and then the digital processor outputs the current command in an analog or digital format to a separate servo-drive that executes only the current control.

To ensure the accuracy of the current, any offsets in the measurement signals may be compensated for in order to minimize their effects, and any mismatch between the gain ratio of a coarse and fine measurement relative to desired gain ratio may be compensated for, to minimize the effect of gain mismatch in order to get a smooth and error free current transition from high to low currents and from low to high currents.

Such offsets and gain mismatch compensations may be carried out manually, during the production process of the drive or automatically by the current controller of the drive.

In the manual case, the offsets and gain mismatch are measured manually and the compensation is stored in a non-volatile memory that the controller is able to use.

In the automatic case, the current controller measures the offsets and gain mismatch, as part of a drive activation process, or at any other time that compensation can be carried out without affecting the proper operation of the drive. The controller may store the compensation values in memory and use it afterwards. Some methods of offset and gain mismatch measurements may require implementation of particular circuits and algorithms, such as adding a high accuracy known reference voltage that the controller can sample and use as a reference for calculating suitable compensation. Reference is now made to FIG. 7, which is a simplified schematic diagram illustrating the case where the current command is generated externally to the drive and feeds the drive as an analog signal.

More particularly, the embodiment of FIG. 7 relates to servo-drives that accept commands in analog format from an external source and executes the current control only. The input command signal, which is initially coarse, is amplified at amplifier 416 by a gain greater than 1, producing a fine command signal. Both the coarse and the fine signals are sampled, either simultaneously or close together, by ADC 414 of the current controller.

The current controller may decide automatically, based on the size of the coarse signal, which of the two, coarse or fine, commands, to use at any given time. If the coarse command is beyond a pre-defined threshold, the current controller uses the fine command. If the coarse command is above the threshold then the current controller uses the coarse command. The fine signal is higher for any given current than the raw coarse command signal. The embodiment of FIG. 7 effectively increases the effective noise free resolution current command for low commands and enables control of low currents more accurately.

As an example, it is assumed that the range of the input command signal range is 0 to 10V. The input command signal reaches the controller free of noise and it represents a command for current in a range of 0 to 10 A respectively; the coarse signal is amplified by a factor of 32 to generate the fine signal. The threshold for selecting between coarse and fine is set to 0.5V. 16 bit ADCs that are noise free are used to sample both signals and the ADC input voltage range is set to 10V. The minimal voltage that the ADC can sample is about 10/65, 536=0.00015V. The noise and offset added to both signals is about 0.00488V, about 32 (=5 bits) times the lowest signal that the ADC can measure. So the effective noise and offset free resolution of the ADC is 11 bits out of the 16. The minimum coarse current command that is noise free is 0.00488 A. Due to the amplification, the minimum fine command that is noise free is 32 times lower and is about 0.00015 A. With the amplified fine signal the effect is similar to using the full 16 bit noise free ADC sampling on a noise free signal whenever the signal is low below the specified threshold.

Using a higher resolution noise free ADC with 18 bits, as an example, and sampling only the coarse command provides an inferior result, as such a solution does not eliminate the noise added to the signal and the minimal useful command is still 0.00488 A. In any event an 18 bit ADC can be significantly more expensive. Selector 420 selects between the fine and coarse commands.

The current command may be a single analog signal describing the desired current amplitude, or several signals that describe the desired currents in more than one of the phases of the motor. For each signal the method of fine and coarse measurement is applied.

The embodiment of FIG. 7 may thus improve the SNR of the sampled analog command, minimizing the negative impact of offsets and electrical noise that is added to the signals by the circuits of the drive.

It is noted that the above command improvement is applicable to any type of drive for any type of actuator, be it a servo motor, a hydraulic motor, a piezzo-ceramic motor or any other. The command may involve current, voltage, pressure or any other measured feature that is required to activate or control the actuator.

Figure 8:
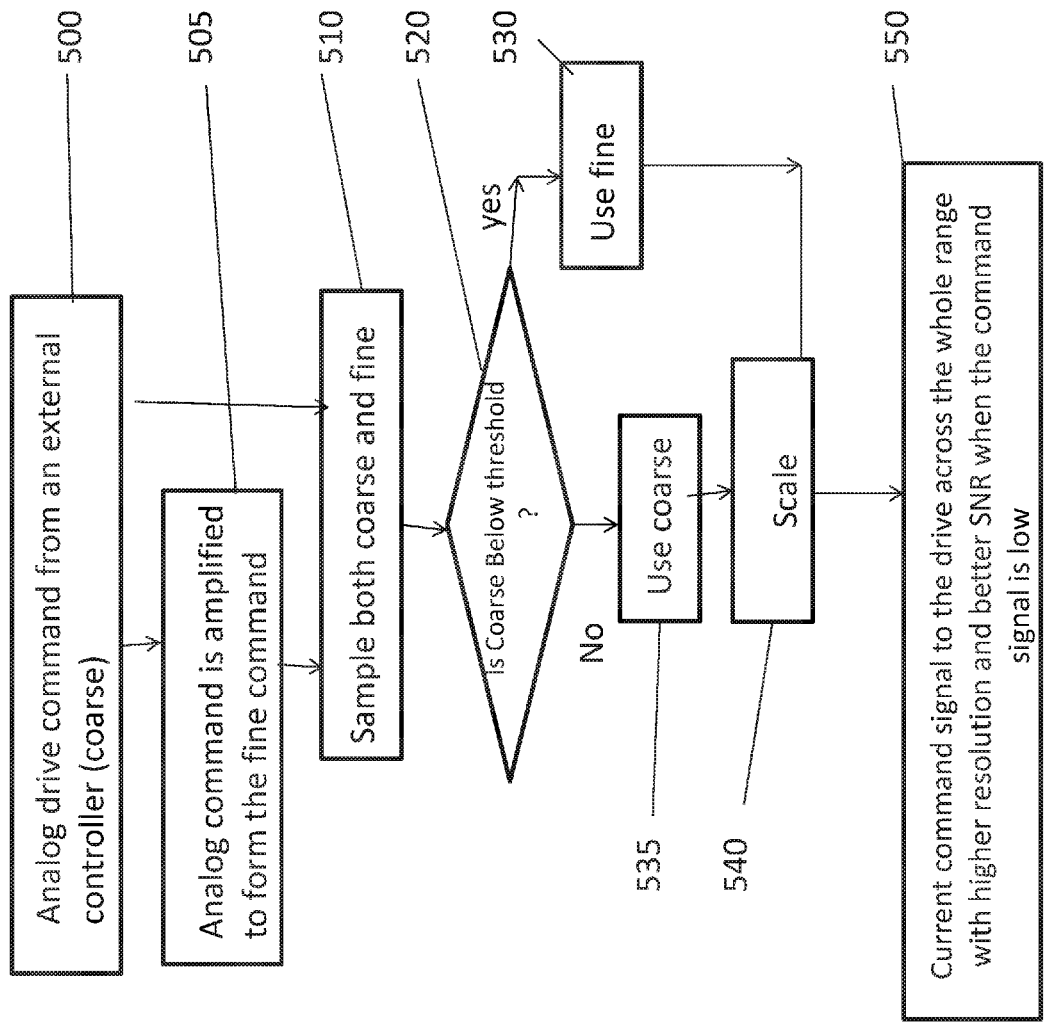
FIG. 8 is a simplified flow chart illustrating operation of the embodiment of FIG. 7.

Reference is now made to FIG. 8, which is a simplified flow chart illustrating the operation of the embodiment of FIG. 7.

Analog drive command signals are provided to the drive by an external controller in stage 500. In stage 505 the command is amplified when it reaches the drive. The raw command forms the coarse command, and the amplified signal forms the fine command. In stage 510 both coarse and fine analog commands are sampled simultaneously, but in an alternative embodiment they may be sampled at different times.

In stage 520 the coarse command is compared with a threshold, and if the coarse command is below the threshold then the fine command 530 is used. If, on the other hand, the coarse command is above the threshold, then the coarse command is used 535. In stage 540 the command signal is scaled according to which of the two signals has been used. The controller then generates 550 a high resolution drive command signal with low noise.

It is expected that during the life of a patent maturing from this application many relevant drives will be developed and the scope of the term PWM drive is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A servo-drive system for feedback-based control of motion and positioning of a motor, comprising:
   a current measurement device configured to obtain a measure of current being drawn by said drive motor, therefrom to provide said feedback;
   the current having an operating range, the operating range comprising a relatively large current range for acceleration but remaining within a relatively smaller current range for steady state operating of said motor, said current measurement device having a first, coarse, sensor optimized for measuring said relatively large current range and a second, fine, sensor optimized for measuring said relatively smaller current range, thereby to maximize accuracy for said feedback during said steady state operation.

2. The servo-drive system of claim 1, comprising a sampler for sampling said first sensor and said second sensor respectively at a same rate.

3. The servo-drive system of claim 1, wherein the drive is one member of the group consisting of a pulse width modulation drive, and a linear drive.

4. The servo drive system of claim 1, wherein said motor may be one member of the group consisting of a single phase motor, a direct current motor, a multi-phase motor, a three-phase motor, an alternating current motor, a two-phase motor, a linear motor and a rotary motor.

5. The servo-drive system of claim 1, further configured to switch on said second, fine, sensor when motor current is below a predetermined threshold, and to electrically short said second fine sensor when said motor current is above said predetermined threshold.

6. The servo-drive system of claim 1, wherein said sensors comprise one member of the group consisting of resistors, current mirror circuits, transformers and Hall-effect based current sensors.

7. The servo-drive system of claim 1, wherein said drive is for a motor having a single phase and said first and second sensors are provided for at least one current measurement of said motor.

8. The servo-drive system of claim 1, wherein said drive is for a motor having a plurality of phases, and said first and second sensors are provided for at least one current measurement of said motor.

9. The servo-drive system of claim 1, comprising an external controller generating an analog current command, said drive connected to receive said analog command from said external controller, and to provide fine and coarse measurement of said analog command.

10. The servo-drive system of claim 1, configured to generate one or more current commands for control of said motor, and selecting one of said first and second sensors based on said one or more current commands.

11. The servo drive system of claim 9, wherein said drive is configured to obtain said fine measurement of said analog command by amplification thereof and to select between said command current before and after amplification.

12. The servo-drive system of claim 1, wherein said second, fine, sensor uses an output measurement range which is larger than that used by said first, coarse sensor.

13. The servo-drive system of claim 1, further comprising offset compensation and gain mismatch compensation for measurements of said fine and coarse sensing, said compensation provided in sensing pairs, thereby to improve at least one member of the group consisting of feedback and analog command signals.

14. A method for current control of a servo-drive for feedback-based control of motion and positioning of a motor, comprising:
obtaining a measure of current into said motor;
providing said measure to provide said feedback, the current having an operating range, the operating range comprising a relatively large current range for acceleration but remaining within a relatively smaller current range for steady state operating of said motor, said obtaining said current measure comprising taking a first, coarse, measure of said relatively large current range and a second, fine, measure of said relatively smaller current range, thereby to maximize measurement accuracy during said steady state.

15. The method of claim 14, comprising sampling said coarse and said fine measures at a same rate.

16. The method of claim 14, further comprising obtaining said fine measure from a measurement output range which is larger than a measurement output range of said respective coarse current sensor.

17. The method of claim 14, further comprising switching on said fine measuring sensor as motor current falls below a predetermined threshold and shorting said fine measuring sensor as said motor current is above said predetermined threshold.

18. The method of claim 14, wherein said motor is a single phase motor, the method comprising measuring at least one current of said motor phase.

19. The method of claim 14, wherein said motor has a plurality of phases, the method comprising measuring at least one current of said motor.

20. The method of claim 14, comprising generating one or more current commands for controlling said motor, and selecting one of said coarse and fine measures for said command based on said one or more current commands.

21. The method of claim 14, further comprising accepting an analog command from an external controller, and obtaining fine and coarse measurements of said analog command.

22. The method of claim 21, comprising amplifying said analog command to provide said fine measurement of said analog command.

23. The method of claim 14, further comprising providing offset compensation and gain mismatch compensation for said fine and coarse measurements, said compensation provided in sensing pairs, thereby to improve at least one member of the group consisting of feedback and analog command signals.

24. A servo-drive for feedback-based control of motion and positioning of a motor, comprising:
a coarse command input for receiving an externally generated command signal as a coarse command;
an amplifier for amplifying said externally generated command signal;
a fine command signal output of said amplifier for receiving said externally generated command after amplification as a fine command signal;
the command having an operating range, the operating range comprising a relatively large range for transition states but remaining within a relatively smaller range for steady state operating of said motor, said servo drive comprising a switch for connecting said coarse command when said command is above a predetermined threshold and connecting said fine command when said command is below said predetermined threshold, thereby to maximize accuracy for said command during said steady state operation.

25. An actuator system with feedback-based control of motion and positioning, comprising:
a measurement device configured to obtain a measure of a controllable feature of said actuator, therefrom to provide said feedback;
the feature being a measurable feature having an operating range, the operating range comprising a relatively large range for transition states but remaining within a relatively smaller range for steady state operating of said actuator, said measurement device having a first, coarse, sensor optimized for measuring said relatively large range and a second, fine, sensor optimized for measuring said relatively smaller steady state range, thereby to maximize accuracy for said measurable feature during said steady state operation.

* * * * *